(12) United States Patent
Corsaro

(10) Patent No.: US 10,250,026 B2
(45) Date of Patent: Apr. 2, 2019

(54) HIGH VOLTAGE JOINT

(71) Applicant: BRUGG KABEL AG, Brugg (CH)

(72) Inventor: Pietro Corsaro, Riniken (CH)

(73) Assignee: BRUGG KABEL AG, Brugg (CH)

( * ) Notice: Subject to any disclaimer, the term of this patent is extended or adjusted under 35 U.S.C. 154(b) by 0 days.

(21) Appl. No.: 15/516,084

(22) PCT Filed: Sep. 29, 2015

(86) PCT No.: PCT/CH2015/000146
§ 371 (c)(1),
(2) Date: Mar. 31, 2017

(87) PCT Pub. No.: WO2016/049788
PCT Pub. Date: Apr. 7, 2016

(65) Prior Publication Data
US 2017/0250531 A1  Aug. 31, 2017

(30) Foreign Application Priority Data
Oct. 1, 2014 (EP) .................................... 14003387

(51) Int. Cl.
*H02G 15/24* (2006.01)
*H01B 9/02* (2006.01)
(Continued)

(52) U.S. Cl.
CPC ............... *H02G 15/24* (2013.01); *H01B 9/02* (2013.01); *H02G 1/14* (2013.01); *H02G 15/22* (2013.01); *H02G 15/25* (2013.01); *H02G 15/30* (2013.01)

(58) Field of Classification Search
CPC ...... H02G 15/08; H02G 15/25; H02G 15/103; H02G 15/184; H02G 15/10; H02G 15/30; H02G 15/188; H02G 15/24; H02G 15/22; H02G 1/14; H01R 4/305; H01R 4/36; H01R 43/00; H01R 11/01; H01R 4/308; Y10T 29/49195; H01B 9/02
(Continued)

(56) References Cited

U.S. PATENT DOCUMENTS

| 2,112,739 | A | * | 3/1938 | Eby ........................ H02G 15/24 174/22 R |
| 2,967,899 | A | * | 1/1961 | Priaroggia ............. H02G 15/24 174/20 |

(Continued)

FOREIGN PATENT DOCUMENTS

| DE | 19804159 | * | 2/1998 |
| DE | 19804159 A1 | * | 8/1999 |

(Continued)

*Primary Examiner* — Timothy J Thompson
*Assistant Examiner* — Michael F McAllister
(74) *Attorney, Agent, or Firm* — Birch, Stewart, Kolasch & Birch, LLP

(57) ABSTRACT

This invention is a device for connecting an end of a HV cable to an HV installation, comprising a pre-fabricated pipe-like unit (2) and the method for installing this device. The pipe-like unit comprises a connection piece (6, 6b) made out of an electrically conducting material and an insulator tube (5, 5r) which is connected to the connection piece (6, 6b) in a fluid-tight way. The insulator tube (5, 5r) is made out of an insulating material. The HV installation is typically a HV joint or a termination.

17 Claims, 6 Drawing Sheets

Figure 1:
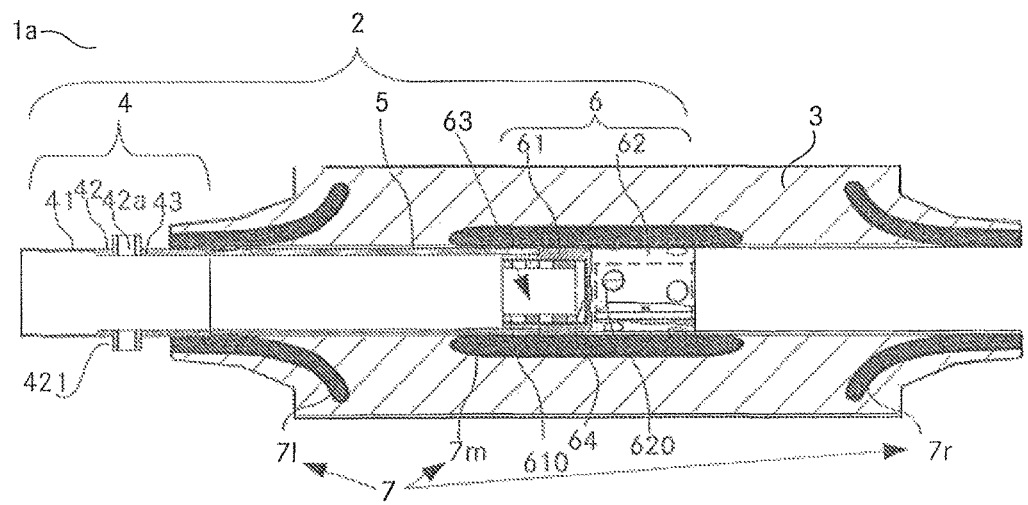

(51) Int. Cl.
*H02G 1/14* (2006.01)
*H02G 15/22* (2006.01)
*H02G 15/25* (2006.01)
*H02G 15/30* (2006.01)

(58) Field of Classification Search
USPC ........................................ 174/84 R
See application file for complete search history.

(56) References Cited

U.S. PATENT DOCUMENTS

| | | | | | |
|---|---|---|---|---|---|
| 2,967,901 | A | * | 1/1961 | Priaroggia | H02G 15/06 |
| | | | | | 174/22 R |
| 3,051,770 | A | * | 8/1962 | Palmieri | H02G 15/103 |
| | | | | | 174/22 R |
| 3,456,065 | A | * | 7/1969 | Gahir | H02G 15/25 |
| | | | | | 174/22 R |
| 3,485,935 | A | * | 12/1969 | Kreuger | H02G 15/103 |
| | | | | | 174/21 R |
| 3,544,700 | A | * | 12/1970 | Priaroggia | H02G 15/10 |
| | | | | | 174/15.6 |
| 3,692,922 | A | * | 9/1972 | Sugimoto | H02G 15/184 |
| | | | | | 174/73.1 |
| 4,099,021 | A | * | 7/1978 | Venezia | H02G 15/10 |
| | | | | | 174/73.1 |
| 4,238,639 | A | * | 12/1980 | Palmieri | H02G 15/103 |
| | | | | | 174/73.1 |
| 4,375,577 | A | * | 3/1983 | Silver | H02G 15/30 |
| | | | | | 174/22 R |
| 4,381,424 | A | * | 4/1983 | Hervig | H02G 15/103 |
| | | | | | 174/73.1 |
| 4,638,112 | A | * | 1/1987 | Giorgio | H02G 15/25 |
| | | | | | 174/22 R |
| 8,097,807 | B2 | * | 1/2012 | Aue | H02G 15/188 |
| | | | | | 174/84 R |
| 8,134,071 | B2 | * | 3/2012 | Aue | H02G 15/103 |
| | | | | | 174/88 R |
| 9,748,758 | B2 | * | 8/2017 | Saugrain | H02G 15/107 |
| 2006/0086529 | A1 | * | 4/2006 | Corsaro | H01F 6/065 |
| | | | | | 174/125.1 |
| 2009/0277685 | A1 | * | 11/2009 | Aue | H02G 15/105 |
| | | | | | 174/84 R |
| 2010/0101835 | A1 | * | 4/2010 | Aue | H02G 15/103 |
| | | | | | 174/21 R |
| 2010/0132976 | A1 | | 6/2010 | Tognali et al. | |
| 2014/0000110 | A1 | * | 1/2014 | Stauch | H02G 15/08 |
| | | | | | 29/869 |

FOREIGN PATENT DOCUMENTS

EP 2403087 A1 1/2012
FR 2911441 A1 7/2008

* cited by examiner

HIGH VOLTAGE JOINT

TECHNICAL FIELD

This is an invention in the field of high voltage cable joints including at least one fluid-filled high voltage cable.

BACKGROUND ART

Joints of high voltage cables are needed and therefore also known since the use of high voltage cables. Older high-voltage cables are of the fluid-filled type. This means, that the insulation and semiconductor layers in these cables are typically made of paper which is soaked with a fluid. The fluid is often oil, but gases are used, too. The fluid has a certain pressure and this pressure has to be controlled during the use of the cable. The installation of such cables, especially the joints, needs a lot of skill and time-consuming manual work as the insulation layers have to be removed at the cable end and have to be adapted and reconstructed for the joint.

In view of the above mentioned disadvantages of fluid filled cables there is a general trend to use solid-insulation cable instead of fluid-filled cables. Today, both cable types coexist. Therefore, there is a need for joints connecting both cable types in any combination.

US 2010/0101 835 A1 (Nexans) describes a joint between a fluid-filled cable and a solid-insulation cable and EP 2 403 087 A1 describes a joint between two fluid-filled cables. The connection on the fluid-filled cable side is in both documents the same. The fluid-filled cable is prepared in the following way: At the cable end, all insulating and semiconducting layers are removed from the conductor. Behind the bare conductor end, the insulation thickness is increased by adding more paper layers. For some distance along the cable, the fluid-tight metallic layer and the outer protection is removed. A part of the cable, starting shortly before the cable end and ending before the beginning of the metallic layer, is surrounded by a partition insulator in which a coupling electrode and a sleeve are moulded. The partition insulator is open at both ends and is at least partially covered with a conducting layer. A connector is placed in front of the cable conductor. Seals in the form of O-rings are places between the connector and the coupling electrodes. The sleeve is somehow connected to the metallic layer of the cable.

In the joint of EP 2 403 087 A1 the same construction is found at the second cable and the two connectors are held together by a metallic ring. In the joint of US 2010 0101 835 A1 the solid-insulation cable connector is surrounded by a filling piece. The details of the connection are not disclosed.

While the symmetry of the set-up of EP 2 403 087 A1 allows the use of a symmetrical body including deflectors and electrodes, the fluid-filled cable side has a significantly different outer diameter than the solid-insulation cable side in US 2010 0101 835 A1. Also the central electrode cannot be symmetric due to the connection.

Both of the joints described in the cited Nexans publications have disadvantages. Many connections between the elements of the joints have to be made in the field (on site). Since several elements have to be connected in a fluid-tight manner it is advisable to test the sealing. However, testing on site is in general difficult. Further more, the insulation of the fluid-filled cable needs to be increased locally in thickness which means that someone with the skill to form paper-insulations needs to be present. This is a skill which is not very common nowadays. At least in EP 2 403 087 A1, considering the way the connectors are connected, there is the risk of a sub-optimal electrical connection. The bulging shape of the sleeve part does not allow to use to standard slipping procedure for mounting the body onto the cable connection in the case of EP 2 403 087 A1. In the case of US 2010 0101 835 A1 the irregular shape of the aperture in the body prevents the use of standard bodies and the standard procedure to mount them.

SUMMARY OF THE INVENTION

The object of the invention is to propose a device for connecting a high voltage (HV) cable to an electrical installation, wherein the device is simpler and needs less manual work to install. In addition, the device should need a minimal testing on site. It is also an object of the invention to provide a method for installation of electrical installations comprising high-voltage cables.

According to the invention, a device for connecting an end of a HV cable to an HV installation comprises a pre-fabricated pipe-like unit. This pipe-like unit comprises a connection piece made out of an electrically conducting material and an insulator tube which is connected to the connection piece in a fluid-tight way.

In the framework of the present invention "High voltage" is understood to mean at least 50 kV, preferentially a voltage in a range of 70 kV to 550 kV.

Examples for HV installations are cable joints and terminations. "Ending" has to be understood in the sense, that also in a cable joint, two cable ends are connected.

The device is especially suitable for joints including at least one fluid-filled cable. A fluid-filled cable is a high voltage cable filled with a fluid. The fluid can be a liquid, like oil, or a gas.

"Pre-fabricated" means here, that the complete pipe-like unit is fabricated before installation on the cables. Preferentially it is fabricated in a factory or a workshop and delivered completely to the installation site where the cables should be joined. Preferentially the pipe-like unit is tested before the installation.

The word "unit" should indicate that it is one piece at the time of the installation. Although the unit can be made out of different materials and different parts, they are not supposed to be separate at any time of the installation process or during the life-time of the joint. A separation of the different parts would indicate a failure of the joint. However, it may be possible that the different parts are combined to a single pipe-like unit just shortly before the installation begins. This should also be understood as "pre-fabricated".

The purpose of the connection piece is to electrically connect the conductors of the cables to be joined. It should therefore be made out of a material which conducts electricity well. An electrically conducting material is here defined as one which is able to transmit the required power in the context of HV transmission. In a preferred embodiment the connection piece is made out of one of the materials of the cable conductors. In another preferred embodiment it is made out of copper, aluminium, silver or an alloy containing one of these elements. In another preferred embodiment, the connection piece is made out of a material which has a conductivity higher or equal to the one of the conductors of the connected cables.

The insulator tube is made out of an insulating material. The insulator tube is in most parts and cases rotation symmetric. The only exception may be at the end regions where the connection piece and a connector piece, to be specified later, are connected. Further the insulator tube has a hole in its centre with a circular cross-section. The hole is centred on the longest central axis. It has a diameter larger than the outer diameter of the inner insulating layer of a fluid-filled cable to be joined. The inner diameter may vary. It may be even smaller than the diameter given above, but only on a short distance right before the connector piece. The outer diameter of the tube may change but only gradually and in an amount, that a body, to be specified later, has a tight sit everywhere it covers the insulator tube. The exact numbers of the maximum possible change (local slope and absolute change) depend on the material of the body. The requirement of a tight fit everywhere means also, that the roughness of the outer surface of the insulator tube should be small. More details will be given later.

The requirement "fluid-tight" depends here also on the type of cable used and the surrounding of it. A certain leakage may be acceptable.

The invention differs from US 2010 0101 835 A1 even though, at first sight, it seems that the prior art shows a similar system for a HV cable joint including a fluid-filled cable. But the prior art system cannot use a pre-fabricated unit of connection piece and insulator. This is because of the way the conductor of the cable is connected to the connection piece. The situation is explained in more detail in EP 2 403 087 A1 which shows a similar system for two fluid-filled cables. There is an insulator which is part of a pre-fabricated unit including the insulator, a metallic sleeve (13) and a coupling electrode (10). But the coupling electrode is not the connector. The connector piece carries the reference numeral 8 and EP 2 403 087 A1 says clearly that there is a gap between the connector piece and the coupling electrode. The connector piece is installed first and then the pre-fabricated unit is placed over it. A seal is placed between them.

The disadvantage of the prior art joint is that the connection cannot be tested prior to being installed on the cable. The tightness depends mainly in the seal which has to be place correctly and without contaminating it. The correct placement and the avoidance of contamination are significant requirements on the skill of the workers.

The advantages of using a pipe-like unit are that the installation of a joint becomes easier and relies on the quality of pre-fabricated and testable parts. Therefore the risk of a failure is reduced. As many of-the-shelf parts known from XLPE-XLPE joints can be used and the pipe-like units can be stored, storage and supply chain management is facilitated. XLPE cables are standard solid-insulation cables. "XLPE" stands for "cross-linked polyethylene" which is the insulating material used in these cables.

The outer shape of the pipe-like unit is in general cylindrical with a central opening. This central opening can be continuous but it can also be closed on a distance small compared to the total length of the unit. The central opening is also cylindrical, but the inner diameter of the pipe-like unit can change on a shorter distance compared to the changes allowed for the outer diameter. Note that the outer shape does not have to be a constant cylinder. Small changes of the outer diameter over longer distances along the length of the pipe-like unit are possible. Both parts of the pipe-like unit contribute to its surface. Therefore both parts have a surface with an essentially cylindrical shape. Note that there can be openings in these cylindrical surfaces. To connect the different parts of the pipe-like unit, one can shape one of the parts in a way that it can be moulded into the other part. Another method of connection is that the parts are formed in a way that they mesh with each other. Then they can be glued.

In a preferred embodiment the connection piece comprises a receiving part of a connection system whereby the connection system establishes an electrical and mechanical connection between a conductor of the HV cable and the connection piece.

There are different connection systems for conductors of HV cables. The conductors can be fixed with bolts or screws. The connection can be realized by crimping. The connection system can have two parts, one of them mounted directly on the conductor. Such a system can for example use clips or threads. The receiving part, which is formed in the connection piece, can be either a male or a female part of a two-part connector system.

In a thread-based system the receiving part can be an internal or external thread. The counter part can then be an external thread mounted on a cap or a ring resp. an internal thread formed inside a pipe which surrounds partially the cable conductor. In a clip system, the receiving part narrows in one region and becomes wider afterwards. Typically the slope towards the narrow part (coming from outside) is significantly shallower than the slope coming to the narrow part from the inside. The counter part has fixing elements which are spring loaded. Typically, these fixing elements have a shallow slope towards the front of the counter element and a steep slope towards the end of it. In many cases, they are only connected to the front end of the counter element. They can be pushed against a force towards the cable conductor which they surround. Once they are released they expand in the direction away from the cable conductor. Therefore, if the they where pushed together by the slow narrowing of the opening in the receiving part, they expand after having passed the narrow region. The difference in slope of the fixing elements causes that entering the counter part into the receiving part requires less force than removing it. There are even systems where the removal causes the destruction of the counter element. A clip connection can also be realised by fixing elements which push to the inside of a receiving part and a counter part in the shape of a cylinder with changing outer diameter, being largest on a small region. The fixing element can also be a ball or a bolt which pushes into a hole or another indented area e.g. due to a spring force or due to gravity.

An alternative to a connection system could be to solder the conductor to the connection piece.

Here the connection system should realize the electrical and mechanical connection in a single system. "Single system" means that the user has to fasten one system to establish both connections.

There is, however; the alternative, that two separate systems are used and that the conductors are mechanically fixed with one system and the electrical contact is provided by a second system. An example for this is a non-conducting mechanical fixing system pressing the conductor against the conducting connection piece.

There are certain requirements on the electrical connection. It has to be ensured, that the conductivity is good enough, that the connection does not heat up more than tolerable by the connection itself and by the surrounding under all possible situations the joint may encounter in its lifetime. Besides the materials and the design of the joint itself, also the surrounding and its heat conductivity may play a role. Besides avoiding damage, a good electrical connection is desired to reduce power losses.

In order to ensure a good electrical contact, the material should be optimized and the contact region should be maximised. Typically copper or copper alloys are chosen as material. Silver and silver alloys would be an alternative.

Aluminium and its alloys are also possible, especially if the cable conductors to be joined are made out of the same material. Any other material used for cable conductors can be chosen. The size of the contact region depends on the details of the contact system.

It is further possible to use the pipe-like unit in applications using super-conductivity. In this case, all used materials have to be able to withstand temperatures of not more than −130° C. The connection piece may be cooled additionally and independently of the cable cooling. However, it is also possible that the same cooling circuit is used for one or both cables and the connection piece. The coolant is typically liquid nitrogen or liquid helium.

The electrical connection has to be able to transmit the power provided by the cables. Besides the electrical contact, the connection system should have a certain mechanical strength. A connection system which reacts to heat in the same way as the cable conductors is less likely to fail due to thermal stresses.

Preferentially a copper alloy such as brass or bronze is used.

In a preferred embodiment, the connection piece has a non-deforming outer shape.

Non-deforming means here that the outer shape of the connection piece does not change due to the process of connecting the cables and also, that it does not change significantly due to outer pressures. In contrast to that, a deforming connection piece is e.g. one where the connection system is a crimping system or one where a sleeve and a filling are needed as shown in the cited prior art. Outer pressures are e.g. applied by if a body containing field shaping elements is fitted onto the pipe-like unit. Other insulation layers will have to sit tightly on the pipe-like unit, too and this tight fit includes in most cases also an increased pressure. Finally there will be some pressure by the environment onto the connection piece. Then there can be an inner pressure due to fluid pressure in connected cables. Of course, there might be a minimal change in the shape due to thermal expansion.

Therefore the term "non-deforming" has to be understood within certain limitations: It means essentially, that the deformations must not cause the pipe-like unit and the connection piece as being part of it, to change from an "allowed" shape into a "not allowed" one. The surface should be step-less, meaning that the material which should surround the pipe-like unit should be able to follow the surface shape. In many embodiments, the pipe-like unit is surrounded by a body (described later) and therefore the body material is the material to consider. The restriction on step-less-ness can be lowered if the material which should surround the pipe-like unit can be adapted in its shape to the surface steps of the pipe-like unit.

In a preferred embodiment, the connection piece forms a fluid-tight cavity and a wall of this cavity forms a receiving part of the connection system.

Cavity means here a concave shape. A fluid-tight cavity has only one opening. Starting from every point inside the cavity but not on the surface, the solid angle under which the cavity surface is "seen" is equal or larger than $2\Pi$. In addition, both, the open region and the surface regions "seen" are continuous areas and there is only one open and one surface region. "Seeing" has to be understood as the view of an imaginary observer with a $4\Pi$ field of view.

The fluid-tight cavity should be suitable to receive a high voltage cable conductor.

Typically this cavity is formed by including an essentially flat barrier inside a shape like e.g. a hollow cylinder or a hollow cone of the connection piece. Other shapes of the barrier are however possible. The barrier can be for example curved; the connection piece can e.g. have a slowly changing outer cross-section. The presence of connection systems, discussed later, can change the inner shape of the connection piece.

The barrier is essentially in the centre of the connection piece. In the normal case, the connection piece has two connection systems. In this case, the barrier is between the two connection systems, separating them in a fluid-tight way.

In a preferred embodiment, the connection piece with the barrier is manufactured in one piece. It is however also possible to assemble it from many pieces as long as the connection piece is everywhere in itself fluid-tight.

The use of a connection piece with a barrier allows to connect a fluid-filled cable with a solid-insulation one and also to form a stop-joint between two fluid-filled cables. A stop-joint separates the fluid circulation from two cables. It can be useful for pressure regulation reasons, for joining fluid-filled cables using different fluids and for other reasons known to a person skilled in the art. Finally a barrier behind the connection system for fluid-filled cables allows it also to mount a termination tip at the other end of the pipe-like unit and producing a cable termination is this way.

Without the barrier, the pipe-like unit can be used to establish a continuous joint between two fluid-filled cables.

In another embodiment, the receiving part of the connection system is not formed by the walls of the cavity but produced as a single piece and mounted into the cavity during the fabrication process of the pipe-like unit.

In a preferred embodiment a receiving part of a connection system has two openings. One of them is the opening to enter a counter part of the connection system. The other one connects the receiving part of the connection system with a second receiving part of a second connection system.

The counter part of the connection system depends on the connection system used. It can be either the bare conductor, a hull in any shape surrounding the conductor or a piece which continues the conductor.

If a connection system has only the two specified openings, the connection system is in itself fluid-tight. (Thereby assuming, that the material is fluid-tight which is given for a reasonable choice of fluids and connection system and connection piece materials in HV applications). Such connection systems have typically two pieces (clip or thread based) or connections based on crimping. As explained above, in a thread bases system, both the receiver and the counter part have threads which mesh with each other. In a clip based system, the one part has a shape which corresponds in a first region to stresses fixing elements and in a second region to relaxed fixing elements. The fixing elements are part of the other part of the connection system. Connections based on crimping or other methods which deform the outer shape of the connection system may need additional units to ensure the mechanical and electrical connection between connection system and connection piece. The mechanical and the electrical connection can be realised in one unit or by two different units. These units and the connection system can be manufactured as a single piece. In any case, the connection piece has to be constructed in a fluid tight manner, so that the fluid can not leave the connection piece. Also, the receiving part of the connection system and the connection piece are preferentially formed and manufactured as a single piece.

With these two requirements, the connection system for fluid-filled cables is preferentially one of the two-part types with e.g. a clip or a thread mechanism. Especially preferred is the thread system explained in detail below.

In a preferred embodiment, the connection piece has an internal thread.

This internal thread can be part of the receiving part of a connection system. In this case, the connection system is a thread-based one. There can be openings inside the internal thread to allow fluid passage between the regions in front of and behind the thread. These openings do not penetrate through the outer surface of the connection piece.

As an alternative, the connection piece can have a different internal shape to work as receiving part of a different connection system.

In another alternative, the thread of the connection piece is used to fix a receiving part of a connection system to the connection piece.

In a preferred embodiment, the connection system for fluid-filled cables comprises a cap with an external thread to be fixed to the conductor of the cable.

The thread of the cap and the thread of the connection piece fit into each other. The diameters of the cap and the inner diameter of the thread region of the connection piece are fitted so that possible size differences between connection piece and cable conductor are adjusted. There may be holes or other ways for the fluid to pass flow essentially parallel to the cable conductor in the thread region. But it is also possible that a pressure adjustment between the regions separated by the thread is achieved by flow along the thread or by diffusion through different parts of the cable. The cap can be fixed in different ways on the conductor: It can be fixed with screws of bolts. It can also be soldered to the conductor. It can be slipped on the conductor and then the conductor can be locally expanded by e.g. entering a nail-like piece into the conductor in direction of the cable. The cap can be formed in a way that it has immediately a tight enough fit and no further fixing is needed. Or the cap can be formed in a way that it can change its inner diameter. It is possible to fix first a "blank" cap to the conductor and produce the thread on it in a second step.

In a preferred embodiment, the connection system for solid-insulation cables comprises holes with threads in a side wall of the connection piece and electrically conducting fixing elements with threads which can be screwed into the holes. The fixing elements have a size that, on the one hand, they are in electrical contact when the cable conductor is in place and the fixing elements are in their end position and on the other hand, they do not protrude from the connecting piece surface when the cable is connected and they are in their end position.

The side walls of the connection piece are the walls of the connection piece which do not separate a first connection system from a second connection system. Side walls separate the inside of the connection piece from the outside of the connection piece. The side walls are for example cylindrical walls.

The preferred connection system for solid-insulation cables is a bolt system. The length of the bolts is chosen to maximize the electrical contact. They should not protrude from the connection piece once they are in place in order to avoid damage to the body which will eventually surround the pipe-like unit which includes the connection piece. It should be possible to slip the body over the pipe-like unit. The bolts should be made out of a conducting material and the choice of material and their size is determined by the factors discussed above for the requirements on general connection systems.

"Protruding from the connecting piece" is here understood as "protruding from the general shape of the connecting piece". Or in other words: The bolts or screws fill the holes in the connecting piece. The small gaps between the connecting piece and the bolts or screws are filled with a special cement. Thereby, a step-less surface is created.

Instead of bolts, screws could be used.

In a preferred embodiment, the device comprises at least one field shaping element.

The pipe-like unit is, in a preferred embodiment, surrounded by the field shaping element.

Field shaping elements are needed in all high voltage joints. A field shaping element is something used to shape the electric field in a desired way. Typical field shaping elements are deflectors and guiding electrodes. They can be made out of semi-conducting material, a conducting material or out of both types of material. The deflectors are, in the final assembly, in electrical contact with the ground of the cables. This is preferentially done either by a direct electrical contact between the deflectors and the metallic layer of the cable or by a direct electrical contact between the deflectors and the outer semiconducting layer of the cables. As the outer semiconducting layer and the metallic layer are in electrical contact with each other, a direct electrical contact to the one causes an indirect electrical contact to the other. Guiding electrodes surround the cable ends and the pipe-like unit and run parallel to it. There is typically one, surrounding the region of the connection piece.

In a preferred embodiment, the device comprises a single-piece pre-moulded body. This body has a continuous opening and includes field shaping elements.

The usual way to install field shaping elements is to include them in a body. Such bodies can be pre-moulded or constructed on-site. The latter is often necessary when the cable diameter vary significantly. Pre-moulded bodies can be delivered in one or more pieces. The field shaping elements are moulded into the body or into the pieces of the body.

The body is in general made out of elastic, insulating material. In this case, the opening is typically chosen to be slightly smaller than the outer diameter of the cables and the connection piece resp. the outer diameter of the pipe-like unit. However the body could also be made out of a non-elastic but insulating material as long as a tight fit can be assured. A typical shape of the body is given by a cylinder with cones at both ends and an opening all along its rotation symmetry axis.

Also in the case of other shapes, the continuous opening should pass through the opening of the deflectors.

In a preferred embodiment the continuous opening of the body has a constant cross-section.

"Constant cross-section" means, that in the relaxed state of the body, the cross-section of the opening does not change significantly over the length of the opening. Note that this can be different in the installed state of the body, as the pipe-like unit and the outer cable diameter may change smoothly and the body should adapt to this change.

Changes in the cross-section are insignificant, if the local pressure difference due to them in the installed state is so small, that the functioning under all design conditions is not affected.

A single piece, pre-moulded body including field shaping elements and having a constant cylindrical cross-section opening is an off-the-shelf product for XLPE-XLPE cable connections. The use of such a body facilitates, therefore; the supply, storage and is in general more economic than a custom-made body.

In a preferred embodiment, the opening of the body is chosen to fit onto the solid-insulation cable if one is present, or onto the pipe-like unit needed for the thicker one of the fluid-filled cables if two fluid-filled cables are connected.

The outer diameter of the pipe-like unit is then chosen to fit to this cable. It is no problem to have more space than needed between the inner wall of the insulator tube and a fluid-filled cable. The adoption at the connection system for fluid filled cables is described above. Further methods needed in this case are discussed below.

The result of the chosen opening diameter is that a constant inner diameter of the body is needed. This makes is possible to use the off-the-shelf components.

Note, that "chosen to fit" means here, that the opening of the body in its relaxed form is not larger than the outer diameter of the cable and the chosen pipe-like unit. In the installation process, the body is expanded. When this force is taken away and the body relaxes and exerts a pressure on the cable and the pipe-like unit. Thereby air bubbles are removed and neither air nor polluting particles can enter the boundary region.

In a preferred embodiment the pipe-like unit has a surface roughness not larger than $R_a=1.6$ μm. $R_a$ is the arithmetic average of the absolute height values.

This ensures, that air bubbles trapped between the insulating tube and the body in cavities due to the roughness cannot have voltages across them greater than the breakdown voltage of air (at the conditions on the installation site at the installation time) during all possible design situations of the cable joint. Further, the surface is step-less. Whereby "step-less" excludes of course the ends of the pipe-like unit.

The one end of the pipe-like unit is the region where the cable enters. The other end of the pipe-like unit is the region where the other cable or the termination tip is mounted. As the pipe-like unit is preferably cylindrical, it has to have a step or an edge at the transition from the lateral surface to the base of it. A similar step or edge is present at geometrical bodies which deviate slightly from cylinders by a changing cross-section along their length. Such steps are not in contradiction to present understanding of the word "step-less". "Step-less" here means that the change of the cross-section of the geometrical body is continuous. Further, changes in the surface must be in a way that the material which should surround the pipe-like unit can follow them. A tight seat without air inclusions and without the loss of function of the body has to be assured everywhere.

In a preferred embodiment, the pipe-like unit comprises a fluid-filled cable connector which is part of the pre-fabricated pipe-like unit.

In this embodiment there is a fluid-filled cable connector in addition to the pipe-like unit described above.

The fluid-filled cable connector should not be mixed up with the connection system for fluid-filled cables. The connection system for fluid-filled cables is a system to connect the conductor of a fluid-filled cable to the connection piece. The fluid-filled cable connecter, however, is provided for the connection of the metallic layer of the fluid-filled cable to the pipe-like unit.

As part of the pipe-like unit, the fluid-filled cable connector has also an aperture and another diameter of about the same size as the insulator tube. The inner diameter may vary along the longitudinal axis of the pipe-like unit, but there is at least a section large enough to include the metallic layer of the cable and a section large enough to include the outer semi-conduction layer of the cable. The two sections can be the same. If they are different, the larger section is the one pointing away from the insulator tube.

The fluid-filled cable connector is connected to the insulator tube in a fluid-tight way. Note that the whole pipe-like unit is pre-fabricated. The fluid-filled cable connector, being part of the pipe-like unit, is therefore also part of the pre-fabricated unit. The connection between the insulator tube and the fluid-filled cable connector can therefore also be tested prior to installation.

In a preferred embodiment the fluid-filled cable connector is made out of a conducting material. In a further preferred embodiment, the volume resistivity of the material of the fluid-filled cable connection is not more than 75 kΩcm. In a further preferred embodiment, the volume resistivity of the material of the fluid-filled cable connection is not more than 50 kΩcm.

As explained above, the field deflector should have electrical contact to the ground layer of the cables. This is the metallic layer in the case of a fluid-filled cable. As the metallic layer is also the fluid barrier of the cable and as a fluid-tight connection between the cable and the pipe-like unit is required, the metallic layer will be connected to the fluid-filled cable connector which is a part of the pipe-like unit. An electrically conducting fluid-filled cable connector in combination with an electrically conducting connection between the fluid-filled cable connector and the metallic layer of the cable is therefore on the same potential as the ground of the cable. This means, that the field deflectors can have contact with the fluid-filled cable connector in order to fulfil their purpose.

This is needed, because the deflectors are moulded into the body and have, therefore, preferentially the same aperture as the body. The aperture of the body should fit to the outer diameter of the pipe-like unit. The outer diameter of the pipe-like unit is larger than the outer diameter of the metallic layer of every involved fluid-filled cable because exactly this layer should fit into the fluid-filled cable connector which is a part of the pipe-like unit. Therefore, one would need a body with changing aperture size in order to fit the deflectors directly on the cable. This would make the installation process more complicated and more expensive. The use of a conducting material for the fluid-filled cable connector is, therefor, preferred.

In a preferred embodiment, the fluid-filled cable connector comprises an inner region which is suitable to contact field defectors and a middle region which has a hole.

The inner region is closer to the insulator tube than the middle region. Both regions are essentially pipe-like. The hole is in the surface of the middle region. The hole should not be the opening in direction of the insulator tube which defines the pipe-like shape.

In handling with fluid-filled cables, one has to monitor and control the pressure inside the cables. This pressure changes for various reasons, like e.g. changing temperatures. During the installation process of joints or terminations, additional volume for the fluid to fill is produced and losses of liquid are likely. Also, unwanted liquid may enter the cable, the joint or termination. In order to monitor and control the pressure, to refill or exchange the fluid in a cable joint, termination or the cable itself, openings are necessary.

In the fluid-filled cable connector such opening can be easily provided. As the fluid-filled cable connector is in itself stiff, connections to pumps, reservoirs and monitoring devices can be realised in a reliable way. Of course, the holes have to be in a region of the fluid-filled cable connector which is outside of the body and therefore outside of the region limited by the deflectors. But the holes have to be inside of the connection to the metallic layer of the cable, as there is no fluid outside of this connection.

The holes can be simple holes in the sidewall of the fluid-filled cable connector. Short pipes can be connected to these holes in order to facilitate the connection to pressure regulating and monitoring devices.

However there is no need for holes. Especially if there is no barrier inside the connection piece, there is only need for holes on one of the two fluid-filled cable connectors present in this special case. In other cases, the fluid regulation may be done at another place along the cable.

If there are holes, there are preferentially two holes per fluid-filled cable connector. The two holes are preferentially placed opposite to each other with a plane containing the central axis of the pipe-like unit as plane of symmetry. The holes can also be shifted with respect to each other in direction of the central axis of the pipe-like unit. Even more preferentially they are placed in the direction of the local gravity.

This allows an exchange of fluids with minimal loss.

In a preferred embodiment the fluid-filled cable connector is made out of a material which can be, directly or by using an additional material, connected to metallic in a fluid tight way.

As explained above, the fluid-tight layer of a fluid-filled cable is typically its metallic layer. There is a fluid-tight connection required between the pipe-like unit and the fluid-filled cable. This connection is preferentially between the fluid-filled cable connector and the metallic layer of the cable. This has the advantage, that there is no additional connection needed as would be the case if another piece was connected to the fluid-filled cable connector. Placing the fluid tight connection between cable and pipe-like unit in the insulator tube would be difficult due to the accessibility. Also the fluid pressure regulation suggested above would not be possible in such a set-up.

Note, that in the case that the outer diameter of the metallic layer of the cable is significantly smaller than the inner diameter of the fluid-filled cable connector, the space between the cable and the fluid-filled cable connector around a small region of the cable close to or at the end of the region covered by the fluid-filled cable connector, can be filled with lead. The lead is typically in the form of a tape which is wrapped around the cable. In this way, a conducting and mechanically sufficiently strong connection can be archived. This method allows a larger flexibility in the use of pipe-like units as it reduces the requirements on the inner diameter of the fluid-filled cable connector.

A similar procedure can be done with other conducting materials like e.g. copper alloys or aluminium alloys and other ways of providing them.

In a preferred embodiment, the fluid-filled cable connector is in electrical contact with at least one field shaping element in the assembled cable joint.

Here, the first region of the fluid-filled cable connector is in electrical contact with one deflector.

As already explained above, deflectors, are needed wherever a high voltage cable ends. The deflectors limit local electrical stress and prevent thereby spark-overs or other damages. The deflectors have to be in electrical contact with the metallic shielding of the cable. In a fluid-filled cable, this is the metallic layer. The metallic layer is preferentially in electrically conducting contact with the fluid-filled cable connector. Therefore, the fluid-filled cable connector becomes part of the metallic shielding of the cable. An electrical contact between fluid-filled cable connector and deflector is, therefore, a way to ensure the working conditions for the deflector. The alternative is an electrical contact between the metallic layer of the cable and the deflector directly or through other connection means like conducting layers or cables. The deflector can also be in electrical contact with the semi-conducting layer of the cable.

Other possibilities to connect the deflectors are discussed above.

There may be also other devices which need to have contact to the grounding conductor of the cable. They are, for the same reason as in the case of deflectors, also preferentially in electrical contact to the fluid-filled cable connector.

In a preferred embodiment, the pipe-like unit comprises only one connection piece, only one fluid-filled cable connector and only one insulator tube.

The embodiment is used in a joint between a fluid-filled cable and a solid-insulation cable. In this case the barrier inside the connection piece discussed above is needed. The barrier and the thereby archived fluid-tightness of the fluid-filled cable side of the pipe-like unit and the fluid-tight connection between the fluid-filled cable and the pipe-like unit assure, that no fluid from inside the fluid-filled cable contacts the solid-insulation cable. This is important, as the materials typically used in solid-insulation cables are destroyed or lose their properties if they have contact to fluids typically used in fluid-filled cables. Even if the material combination is no problem, a fluid-tight barrier is useful because a leak on the fluid-filled cable side of the joint would cause a pressure loss in the fluid-filled cable.

By mounting a pipe-like unit on a fluid-filled cable, constructing joint between fluid-filled and solid-insulation cables becomes nearly as easy as the installation of a joint between two solid-insulation cables. Besides the pipe-like unit, off-the-shelf components from solid-insulation-solid-insulation cable joints can be used.

In another preferred embodiment, a termination lug is connected to the connection piece. In this way a termination of a cable is established.

This type of termination is suitable to be used at the end of fluid-filled cables. The connection piece is one with a barrier inside. The connection piece is formed such that there is a connection-system for fluid-filled cables on the one side. On the other side, is formed such that there is either directly a termination lug or a connection-system suitable to connect a termination lug.

The fluid-filled cable is connected, electrically, mechanically and in a fluid-tight way, to the pipe-like unit at the connection system for fluid-filled cables at the connection piece and at the fluid-filled cable connector. The termination lug is either directly part of the connection piece or it is installed according to the connection-system used.

Again deflectors limit the local electrical stress and prevent thereby damage. These field shaping elements can be part of a suitable body for terminations. This body can be again an off-the-shelf part as known from solid-insulation terminations. The deflector is placed in such a way onto the pipe-like unit, that it has electrical contact to the fluid-filled cable connector.

Additional parts and protection layers may be added as known to a person skilled in the art. In a further preferred embodiment, the pipe-like unit comprises two insulation tubes, two fluid-filled cable connectors and one connection piece.

In this embodiment, two fluid-filled cables can be connected. There are two types of fluid-filled cable joints which can be realized with this set-up. On the one hand, there can be a barrier inside the connection piece. A joint constructed with such a pipe-like unit is called "stop joint". On the other hand, the connection piece can have a continuous aperture and in this case the resulting joint is called "continuous joint".

In both cases, both cables are connected through connection systems for fluid-filled cables and fluid-filled cable connectors. The pipe-like unit is in a preferred embodiment symmetric with respect to a geometric plain which passes through the centre of the pipe-like unit and which is perpendicular to one of the insulation tubes. However, it is also possible to use different connection systems for fluid-filled cables.

In a preferred embodiment, the pre-moulded body is pre-installed on the pipe-like unit.

"Pre-installed" means that the body is placed on the pipe-like unit before any cables are connected.

Such a pre-installation can be made, if no direct access to the connection piece is needed. It has the advantage that an even more complete assembly can be tested, the time on the construction site can be minimized and the installation of the body on the pipe-like unit can take place under controlled conditions.

A pre-installed body is especially useful in the case of fluid-filled-fluid-filled joints. The pipe-like unit, comprising two insulator tubes and two fluid-filled cable connectors, is in this case longer than the body which has to be mounted on it. The body is, therefore, already in its final position, at the time of the installation of the cables. The cables can be easily placed inside the pipe-like unit as there is no need for a tight fit between the outer diameter of the cable (after removing the appropriate layers) and the inner diameter of the pipe-like unit. The space between the two is filled up with the fluid. The fluid-tight connection between metallic layer and fluid-filled cable connector can be realized by adding material at proper places as explained above. Possible connector systems which do not need direct access by the worker are clip and thread systems for example.

In the case of a stop joint connecting two fluid-filled cables, the holes in the fluid-filled cable connector can be formed with small pipes on both fluid-filled cable connectors. Especially in this case, but also in all others, the body can be moulded directly onto the pipe-like unit. This step can take place under controlled conditions prior to the joint installation. So the body and the pipe-like unit may be a pre-installed device, which is delivered as a unit to the installation site for connecting the cables.

In other cases, a suitable body can be slipped over the pipe-like body. It is also possible to expand the aperture of the body sufficiently to slip it over small pipes protruding around holes in a fluid-filled cable connector.

In the case of a pipe-like unit comprising one fluid-filled cable connector, one insulation tube and one cable connector for solid-insulation cables, the installation is less straight forward. There has to be a pressure from the body onto the solid-insulation cable once the joint is installed. One may solve this problem by either expanding the body aperture at the time the cable should be connected or at an earlier time. Once the cable is then inserted and the connection to the connection piece is done, the expansion is relaxed and there is a tight fit between the solid-insulation cable and the body. Note that the connection system for solid-insulation cables has to be also one which can establish a connection without direct access for a worker. Preferentially, the connection system for solid-insulation cables is, therefore, also a clip or thread based one. As this is the same system as suggested for fluid-filled cables, it should be clear, that the expression "fluid-filled cable connection system" does not mean that it has to be used with a fluid-filled cable but only that it is possible to use it for a fluid-filled cable in a way that no fluid leaks.

In a preferred embodiment, there are two fluid-filled cable connection systems, one with a right-handed thread and a second one with a left-handed thread.

Having two fluid-filled cable connection systems based on threads and with different handedness allows one to tighten the threads at both connection systems at the same time with a single motion of the pipe-like unit in one direction. This means, that two cables can be fixed at the same time and without access to the connection piece. This is especially useful in the case when two fluid-filled cables should be connected to the same connection piece. Note that when a solid-insulation cable should be connected with a thread connection inside a pre installed body, the body aperture has to stay in its expanded state during the rotation. Otherwise the cable would twist in itself due to the friction between cable and body. However it may be possible that suitable materials allow to lower this friction and thereby a turning of the pipe-like unit together with the surrounding body around a solid-insulation cable in the inside.

Instead of using a thread base connection-system a clip-based connection system could be used. Thereby there is no turning. Other connection systems without the need of direct access should not be excluded.

There can be a cable joint comprising the device and at least one fluid-filled high voltage cable.

This cable joint can include all of the above mentioned variations of the pipe-like unit and the body. All of these cable joints have the advantage that they are easier to construct, that important parts can be tested prior to installation and in many cases, off-the-shelf components can be used.

The second cable to be connected with the first cable can be a fluid-filled or a solid-insulation type one. If the types of the cables or the fluids used are different, a stop-joint has to be used. If both cables are fluid-filled and the fluids are the same, a continuous-joint can be chosen, but also a stop-joint is possible. The outer diameter of the connected cables can be different.

In a preferred embodiment, the size of the pipe-like unit is chosen to comply with the cable with the larger diameter.

Such a choice assures that the pipe-like unit fits for both cables, if both cables are fluid-filled ones. If one is a solid-insulation one and the solid-insulation one is the one with the larger diameter, the choice assures that the outer radius of the pipe-like unit and the outer radius of the outer semiconductor layer of the solid-insulation cable are about the same.

This allows one to use bodies with a constant inner diameter. However, the constant outer diameter cannot be realized if the solid-insulation cable is thinner than the fluid-filled one. As the fluid-filled cable has to fit inside the pipe-like unit, the size of the pipe-like unit cannot be smaller and, therefore, there is step in the outer diameter. In such a case, one may need a custom made body. However, by adapting the amount of insulation taken off of the fluid-filled cable it may be possible to fit a thicker fluid-filled cable in a pipe-like unit with the same diameter as the solid-insulation cable.

Further, the connector piece may have a conical shape to guarantee a stepless surface between the insulating part of the pipe-like unit and the insulating part of the solid-insulation cable.

In a preferred embodiment, a radial gap between a metallic layer of a fluid-filled cable and a fluid-filled cable connection is filled with lead tape.

This method was already explained above with all its alternatives. It allows one to use a pipe-like unit with an inner diameter at the outward end significantly larger then the outer diameter of the cables metallic layer.

A termination in accordance with the invention comprises a fluid-filled high voltage cable and the device for connecting an end of a HV cable to an HV installation, comprising
a) a termination lug which can be part of the pipe-like unit or can be connected to it and
b) field defectors and
c) a pre-fabricated pipe-like unit, which comprises
d) a connection piece made out of an electrically conducting material and
e) an insulator tube which is connected to the connection piece in a fluid-tight way.

For such a termination, the embodiment of the device with one fluid-filled cable connector, one insulator tube, one connection piece and one termination lug surrounded by suitable field shaping elements is used.

Such a termination has the advantage that it is easy to install, that important parts can be tested prior to installation and that off-the-shelf components known from and used for solid-insulation terminations can be used.

A method for installing a pipe-like unit with a fluid-filled cable connector comprises the following steps:

Providing a bare end of a fluid-filled cable comprising a conductor, a semiconducting layer and metallic layer and a protection layer, by removing said layers from the conductor and of placing the pipe-like unit on the bare end of the fluid-filled cable and fixing the conductor to the connection piece.

The pipe-like unit is placed on the bare end of the fluid-filled cable and the other side of the pipe-like unit is placed on the other cable. The cables are fixed to the connection piece. The order of these tasks depends on the fixing mechanism used and the involved cables The way one prepares a conductor so that it can be connected to the connection piece depends on the connection system used. In most cases the first step is to remove all surrounding layers of the cable on a short distance. The length of this distance depends again on the connection system used and the dimensions of it. In a two piece connection system, the male part may be mounted onto the conductor. In other systems, a hull may be placed over it. It is also possible that the conductor has to be shaped in a certain shape. In some connection systems, no further steps are needed.

The preparation of the other parts of the cable means to remove certain layers from the cable. The length on which a layer has to be removed depends on the dimensions of the HV installation.

The pipe-like unit is chosen to have a larger inner diameter that the outer diameter of the prepared cable at the corresponding places. The inner, resp. outer diameters of both parts change in a way that the cable can be inserted into the pipe-like unit it is in its final, completely fixed position.

The other side of the connection piece can have another connection system for fluid-filled cables and another insulator tube. Then the connection of the second cable is analogue to the connection of the first cable. Another possibility is that a solid-insulation cable should be connected on the other side. In this case, it is only the prepared conductor of this cable which in inserted into the connection system. Finally, if a termination lug is used, there is no second cable at all but only a termination lug which may have to be connected to the connection piece. In an alternative embodiment, the termination lug is part of the connection piece and, therefore, there is no other cable which needs placing.

In a further embodiment, the method comprises the step of installing the field shaping elements. The field shaping elements have to be placed and fixed at the correct places in order to work.

In the case of a pipe-like unit with two insulator tubes and two fluid-filled cable connectors, the field shaping elements can be installed onto the pipe-like unit. Note that this does not mean that they have to have full contact to the pipe-like unit. There can be some space between them and the pipe-like unit. This space can be filled with another material. In a preferred case, the field shaping elements are included in a body and in this case, the pipe-like unit is placed inside the body so that the field shaping elements are at the required positions relative to the pipe-like unit and therefore relative to the different cable parts once the joint is installed.

In the case of a pipe-like unit with only one insulator tube and the use of this pipe-like unit is a cable joint, some of the field shaping elements are placed on the pipe-like unit, some of them are placed partially on the pipe-like unit and some are places only on one of the cables. There are three possibilities to install the field shaping elements in this case. One possibility is to use a structure, like a body, which holds field shaping elements in the desired position relative to each other. Then this structure can be place on the pipe-like unit and after that the cable, which is not supposed to be inside the insulator tube, is installed so that the required geometry of field defection devices, pipe-like unit and cables is realized. The second possibility is to use a structure holding the field shaping elements, to connect first all cables to the pipe-like unit and to place then the structure over the pipe-like unit and the cable in the required position. Finally, there is the possibility to connect the cables and the pipe-like unit first and to place then the field shaping elements at the desired places. In this case, there is no structure needed a priori. However, adding a structure like a body may be needed. It is also possible that the structure and the field shaping elements are installed simultaneously by e.g. placing a layer of structure-material around the joint, placing field shaping elements on this layer and then adding more structure material.

In the case of a pipe-like unit used in a termination, there is only one deflector. This deflector is placed on the pipe-like unit. It can therefore be installed similar to the "pipe-like unit with two insulator tubes".

In a preferred embodiment a solid-insulation cable is prepared in a way, that the conductor is laid open on a sufficient length to connect it to the connection piece and that a semiconductor layer of the cable is in contact with at least one of the field shaping elements when the body is in its final position. In a preferred embodiment, the semiconductor layer of the cable is in electrical contact with a deflector. As an alternative, the deflector is in electrical contact with the metallic shielding layer. Possible methods to prepare the conductor of the solid-insulation cable are the same as in the fluid-filled cable case. The desired result of the preparation depends on the chosen connection system.

The field deflector which contacts the semiconductor layer of the solid-insulation cable is in a preferred embodiment a part of a stress-cone. In another preferred embodiment, it is part of a joint body. Both, stress-cones and joint bodies are examples of bodies. In a preferred embodiment the installation of the field shaping elements is done by slipping the body in a park position on one of the cables prior to connecting the cables, and, after connecting the cables, slipping the body on the pipe-like unit, so that all fluid-filled cable connectors contact a field deflector.

This is one method of placing the field shaping elements on the connected cables. In this case, the field shaping elements are placed inside the body. The aperture of the body is expanded so that the body can be placed on one of the cables. In general, the cable is chosen on which side there are no protruding pipes around the holes in the fluid-filled cable connector. If there is a solid-insulation cable involved, then this is typically the chosen one. If there are two fluid-filled cables to be connected, it depends on the type of holes on both sides. It may be that there are only holes on one side or that only the holes on one side are surrounded by protruding pipes. The cable on the side without protruding pipes is chosen. If there are no protruding pipes on both sides, the cable with the larger diameter is chosen. If both cable diameters are the same, any cable can be chosen. Also in the other cases listed above, it is possible to choose the other cable. If the body is slipped on a fluid-filled cable, there can be a sharp increase in the outer diameter between the outer diameter of the part of the fluid-filled cable close to the beginning of the pipe-like unit and the outer diameter of the pipe-like unit. If this is the case, it may be necessary to either expand the body aperture before slipping it on the pipe like unit, to fill gaps temporally or even to place the body onto an auxiliary pipe which is then placed onto the cable. This pipe should have the same outer diameter as the pipe-like unit.

The length of the pipe-like unit has to be chosen so that the deflectors can have the required distance with respect to each other. As the deflectors should be placed on the fluid-filled cable connectors and possibly present electrodes should be placed in certain positions relative to the connector piece, the length of the pipe-like unit is determined. The exact numbers are known to a person skilled in the art and comparable to the ones used in conventional solid-insulation high voltage joints.

In another preferred embodiment the installation of the field shaping elements is done by slipping the body in a park position on one of the cables prior to the connecting them, and, after connecting the cables, slipping the body on the pipe-like unit, so that all fluid-filled cable connectors contact a field deflector and part of the semiconductor layer of every solid-insulation cable contacts a field deflector.

The difference to the installation method explained before is that there is now only one fluid-filled cable. Therefore only one deflector can have contact with only one fluid-filled cable connector. The other deflector has direct contact with the semiconductor or the metallic layer of the solid-insulation cable. Therefore, two distances are determined by the geometry of the field shaping elements: The length of the pipe-like unit and the length on which the semiconductor layer of a lower layer of the solid-insulation cable is exposed.

In a preferred embodiment, the fixing of a fluid-filled cable comprises the steps of fixing a cap with an external thread to the conductor of the cable, screwing the pipe-like unit with an internal thread at the connector piece on the cap on the cable conductor and realizing a fluid tight connection between the fluid-filled cable connector and the metallic layer of the fluid-filled cable.

This explains how a thread based connection system of a fluid-filled cable works. Fixing a suitable cap to the conductor of the cable is part of the conductor preparation. This fixing can be done in different ways: One could use small screws or bolts. One could also use deforming parts and press the cap in this way on the conductor. Or the conductor could be shaped in a way that a cap is fixed to it. This is e.g. the case if cap and conductor have such a tight fit, that no further fixing is necessary. Or the conductor can be expanded after the cap is pushed on it so that the cap is then fixed by the deformed conductor. Soldering and similar methods are also possible. Screwing the one thread into the fitting other one is straight forward.

A fluid tight connection between the fluid-filled cable connector and the metallic layer of the fluid-filled cable can be realized by soldering, casting or other means. The use of a lead tape or other methods to fill in larger gaps was discussed above.

In a preferred embodiment, fixing a solid-insulation cable comprises the steps of inserting the conductor of the cable in the receiving part of the connection system of the connector piece which has holes with threads and screwing conducting fixing devices into the holes of the connector piece so that they establish an electrical contact between the cable conductor and the connector piece.

Fixing a solid-insulation cable in the preferred connection system for solid-insulation cables requires less preparation: All layers surrounding the conductor have to be removed. One may place a hull around the conductor and connect the hull by e.g. deforming it. Also other steps to prepare the conductor can be taken.

The electrical and mechanical contact to the connection piece is then realized by screwing fixing devices in holes with threads in the connection piece and into or onto the conductor lying partially inside the connection piece.

The fixing devices can be screws or bolts. It may be possible to break off their heads once they are in their final position. In the final position and, if applicable, without their heads, a significant area of the fixing device surface is in contact with the conductor, another significant area of the fixing device surface is in contact with the connector piece and they are not protruding from the general outer shape of the connector piece.

In another preferred embodiment, fixing of two fluid-filled cables comprises the steps of fixing caps with external threads with different handedness to the conductors of both cables, screwing the pipe-like unit with two different handed threads at the connector piece on both cables at the same time and realizing fluid-tight connections between the fluid-filled cable connection and the metallic layer of the fluid-filled cable on both sides of the joint by soldering with the option to add metallic layers between the fluid-filled cable connection and the metallic layer of the cable.

In principle, connecting two fluid-filled cables to one pipe-like unit is similar to connecting two times one fluid-filled cable to the different sides of the pipe-like unit. The use of threads of different handedness and the method to connect both cables at the same time allows one to only turn the pipe-like unit, and possibly the body mounted on it. Prior to turning the pipe-like unit, both prepared cable ends have to be place inside the receiving part of the connection system, so that both connection systems need the same number of rotations to tighten. If only one side starts to bind, it has to be released again, the position of the other cable has to be improved and the turning can be started again.

Alternatively, the threads can be long enough, that a few rotations difference between the two threads do not change the conductivity and stability of the connection. This increases the flexibility concerning the moment of the binding.

Note that a similar procedure can be applied in a connection including one solid-insulation cable. In order to work, the solid-insulation cable has to be prepared so that there is a cap with a thread on its conductor. Both connection systems at the connector piece have to by of the thread type and have to have different handedness. As in the case with the two fluid-filled cables, both cables are place at the beginning of the threads of the female part of the connection system and the pipe-like unit is turned until both connection systems are tightened.

A preferred embodiment for installing a pre-fabricated device comprising a pipe-like unit and a body, comprises the steps of fixing caps with external threads with different handedness to the conductors of both cables, screwing the device, comprising a pipe-like unit including a connector piece with two, different handed, threads and a body with field shaping elements, on both cables at the same time and realizing fluid tight connections between the fluid-filled cable connection and the metallic layer of the fluid-filled cable on both sides of the device.

This installation procedure is already explained above. Here, the body is mounted on the pipe-like unit and therefore pipe-like unit and body are turned together to fix both cables at the same time.

When connecting a solid-insulation cable, there have to be means to reduce friction between the solid-insulation cable and the body. It has to be ensured, that the solid-insulation does not twist around itself when the combination of the pipe-like unit and the body is turned, but that the cap of this cable turns relatively to the connection piece in the same amount as it happens on the fluid-filled cable side. This friction reduction can be achieved by expanding the aperture of the body in the contact region of body and cable. One could also insert one or more layers of a suitable material which reduces friction. After tightening the connection, these layers can be removed.

In a preferred embodiment, a pump is connected to a hole in the side of the fluid-filled cable connection and a pump is used to remove any undesired fluids, e.g. air.

A fluid-filled cable is filled with a fluid during its use. Installations on fluid-filled cables where they need to be opened as it is the case when installing a joint, are done in two ways: Either there is a running stream of fluid or the all of the installation where fluid containing layers are open is done in an environment of this fluid (continuous flow method) or the fluid is stopped and an isolated-fluid cable part is formed (insulated-fluid method). The isolated-fluid cable part is a part of the cable between the end of the cable and a boundary which separates the fluid flow. Such a boundary can be formed by freezing the fluid at some point. While the continuous flow method is often messy and requires a lot of fluid, the use of the insulated-fluid method causes other fluids like air to enter the isolated-fluid cable part. These other fluids have to be removed prior to using the cable. The easiest way to do that is to evacuate the cable prior to allowing the normal fluid to enter the isolated-fluid cable part again. Of course the isolated-fluid cable part has to be a fluid-tight space in order to allow evacuation. In the installed form, the isolated-fluid cable part and the pipe-like unit form such a fluid-tight space. If there are holes in the fluid-filled cable connector, a pump can be connected to one of them; all other holes have to be sealed in a fluid tight way. The pump can then evacuate the fluid-tight space. The evacuation process can also be used as a test for the fluid-tightness of the system.

In a preferred embodiment there are two holes in the fluid-filled cable connector and fluids are removed through a first hole and a desired fluid is provided through a second hole.

If the fluid-filled cable connector has two holes, preferentially at opposite positions and even more preferentially along the direction of gravity, the volume consisting of the separated cable part and part of the pipe-like unit as well as the connected pipes to pumps and reservoirs can be filled with the desired fluid by the standard procedure of filling in fluids in a volume. Depending on the density of the fluid to be replaced and the fluid to be entered, the location of the pump and reservoir connection is chosen. The desired fluid is provided from a reservoir into the volume to fill because of the dropping pressure of the fluid to be removed. The pressure of the fluid to be removed drops due to the action of the sucking pump. Instead of using a sucking pump, a pushing pump could be used. In this case the desired fluid is pushed from a reservoir into the volume to fill and displaces the fluid to be removed which escapes therefore through the other hole which may be open to ambient pressure or connected to a low pressure reservoir. It is also possible to evacuate the volume in a first step and to add the desired fluid later. In any method, it is possible to continue the pumping process until a certain amount of desired fluid has left the volume again. It is also possible to monitor the amount of fluid to be removed in the desired fluid leaving the volume. This measurement can help to determine the end of the refilling process. Other filling procedures can be also applied.

Once the volume is filled with the desired fluid at the desired pressure, pressure monitoring and regulation devices can be connected to the one or more holes. These devices can be pumps, reservoirs, measurement devices and similar things. If a hole is not needed to connect such a device it has to be closed in a pressure tight way.

In order to close holes in a fluid tight way or in order to regulate the fluid flow during the filling procedure or later during monitoring and regulation processes, valves can be connected between the holes and the devices just discussed.

The method to install the cable joint comprises the methods explained above for installing the pipe-like unit and the body and covering the body and the cable ends with shielding and protection layers.

In order to have a complete cable joint, the body is in its final position covered by shielding and protection layers. The same is done with the parts of the cable where some outer layers are missing.

SHORT DESCRIPTION OF THE DRAWINGS

The following drawings are used to explain the preferred embodiments:

FIG. 1: Cross section of the inner part of a hybrid joint, connecting a fluid-filled cable with a solid-insulation cable.

Figure 2:
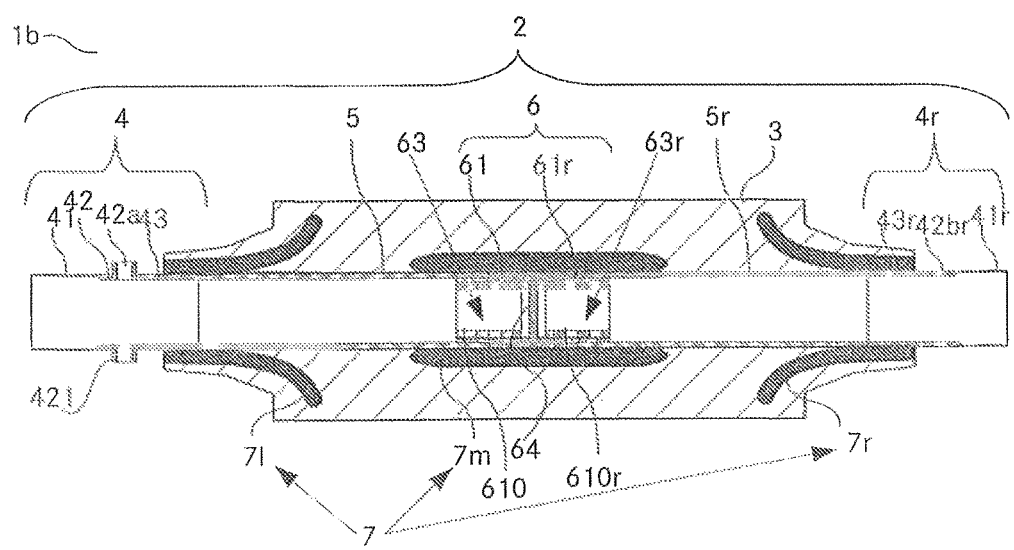

FIG. 2: Cross section of the inner part of a stop joint connecting two fluid-filled cables.

Figure 3:
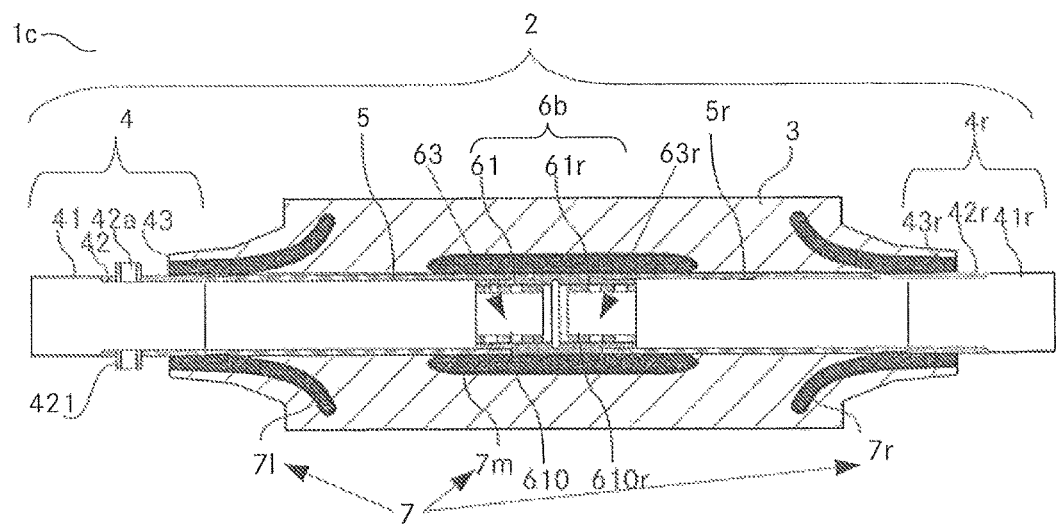

FIG. 3: Cross section of the inner part of a continuous joint connecting two fluid-filled cables.

Figure 4:
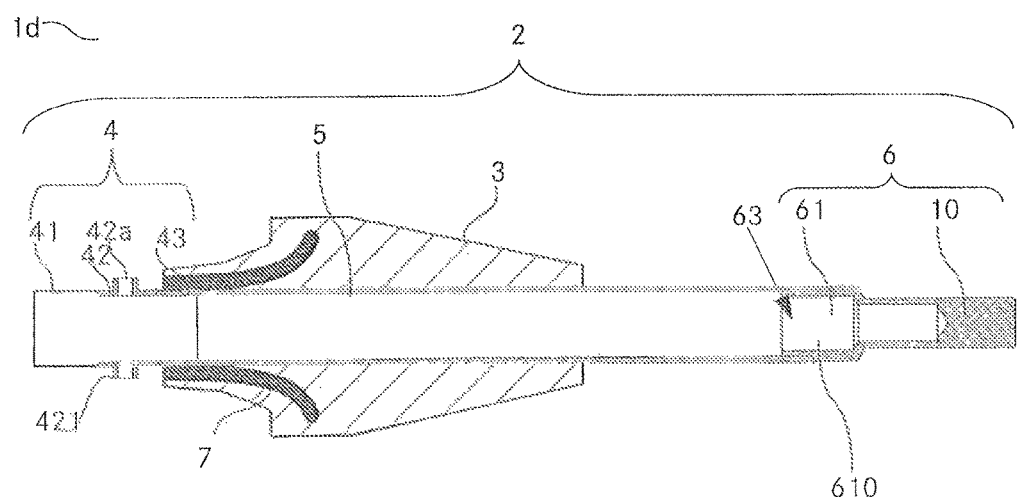

FIG. 4: Cross section of the inner part of a termination of a fluid-filled cable.

Figure 5A:
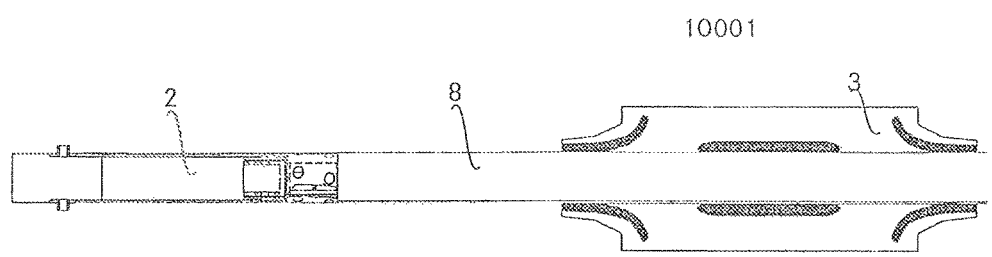

FIG. 5a, b: Illustration of the installation process of the hybrid joint

Figure 6:
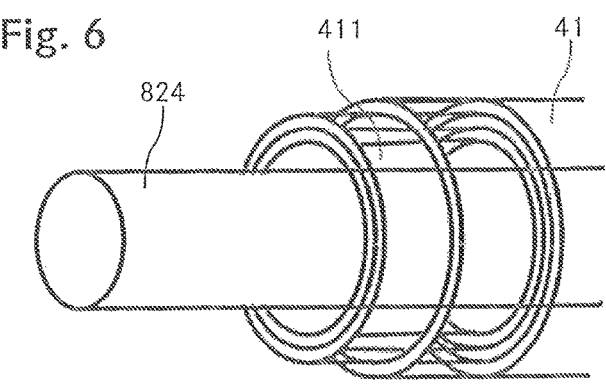

FIG. 6: Use of lead tape

Figure 7:
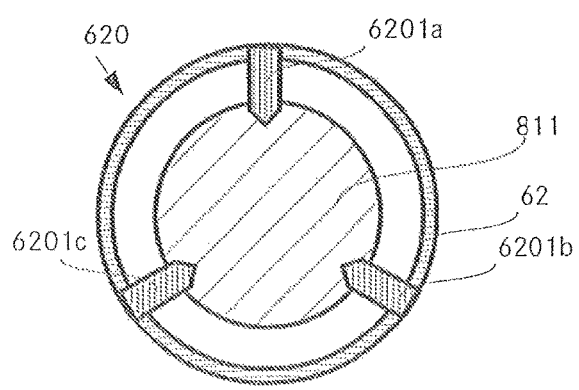

FIG. 7 Solid-insulation connection system

Figure 8A:
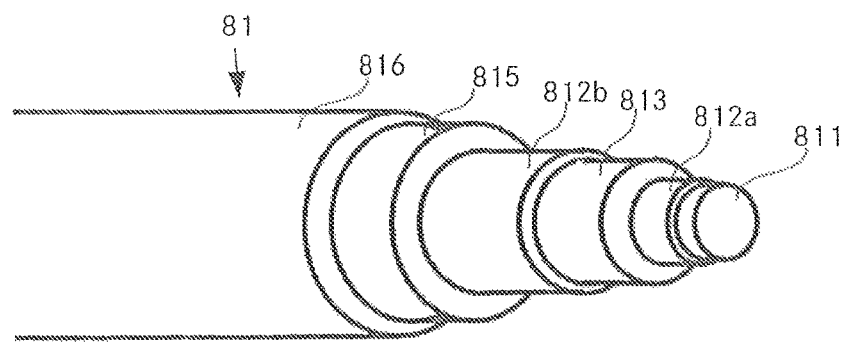

FIG. 8a, b: Set-up of standard high voltage cables.

Figure 9A:
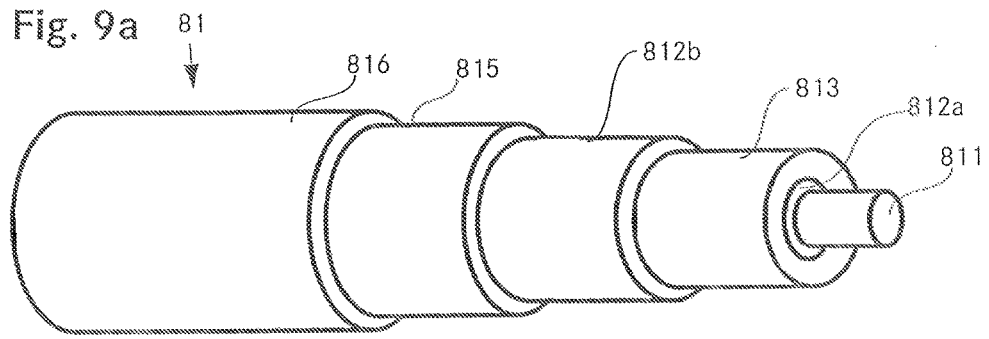

FIG. 9a, b Prepared standard high voltage cables.

As a matter of principle, the same parts are designated with the same signs in all figures.

PREFERRED EMBODIMENTS

Figure 8B:
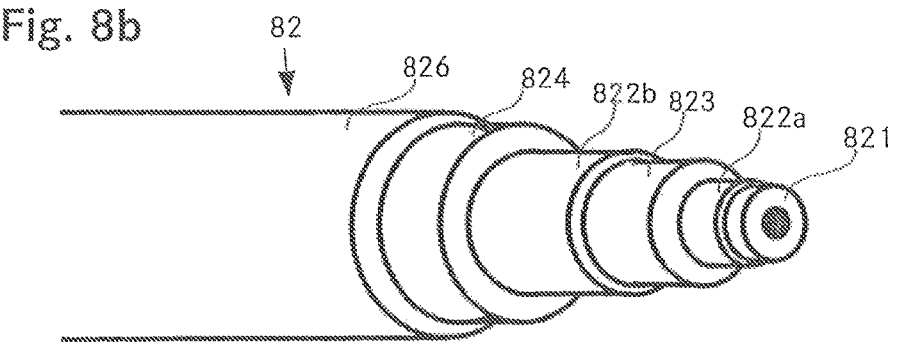

FIGS. 8a and 8b show the structure of high voltage cables as they are known from the prior art.

FIG. 8a shows a XLPE cable as an example of a solid-insulation cable 81. There is a conductor 811 in the centre. Surrounding the conductor, there is an inner semi-conducting layer 812a. In the solid-insulation cable, the semiconductor is a solid. The insulation layer 813 is on top of the inner semi-conducting layer 812a. It can be made out of XLPE (a type of polyethylene) in the case of a solid-insulation cable. The insulating layer 813 is then surrounded by an outer semiconductor layer 812b. It can be made out of the same material as the inner semiconductor layer. An outer electrical shielding 815 surrounds the outer semiconductor layer. The shielding is surrounded by one or more protective layers 816. It is important that there be no unwanted inclusions inside the cable like e.g. air bubbles or dust between the inner and the outer semi-conducting layer 812a and 812b. The voltages across such inclusions when the cable is in use can be high enough to cause a spark-over destroying thereby the cable.

FIG. 8b shows a paper-oil cable as an example for a fluid-filled cable 82. There is a conductor 821 in the centre. In the case of the fluid-filled cable 82, the conductor may be hollow, allowing the fluid to flow in the channel formed in this way. The fluid is typically oil, so that the following explanation is based on oil-filled cables. Surrounding the conductor, there is an inner semi-conducting layer 822a. In paper-oil cables this semiconductor is made out of especially treated paper soaked in the oil. The insulation layer 823 is on top of the inner semi-conducting layer 822a. It is made out of suitable paper soaked with oil in a paper-oil cable. The insulating layer 823 is then surrounded by an outer semiconductor layer 822b. It can be made out of the same material as the inner semiconductor layer. An outer electric shielding 824 surrounds the outer semiconductor layer. The shielding is normally fabricated as a closed, fluid-tight cover 824 in the case of the paper-oil cables. The fluid-tight shielding layer is typically metallic and made out of lead, corrugated aluminium or stainless steel. The shielding and the fluid-tight layer, respectively, are surrounded by one or more protective layers 826.

By connecting oil-filled cables, it is important that the oil cannot leave the cable in an uncontrolled way or that unwanted fluid enters the cable.

FIG. 9a shows a solid-insulation cable 81 prepared to be connected to a pipe-like unit 2 with a solid-insulation cable connector 62. The conductor 811 is bare on a length needed for the connection. This is about the length of the receiving part of the connection system, typically about half of the length of the connection piece 6.

Following this part, the insulation layer 813 is the outer layer. This means, that the outer protection layer 816, the shielding layer 815 and the outer semi conductive layer 812b are removed. The total length on which the outer protection layer is removed is at least half of the length of the body. In the installed state, the deflector 7r should be in contact with the shielding layer 815.

Figure 9B:
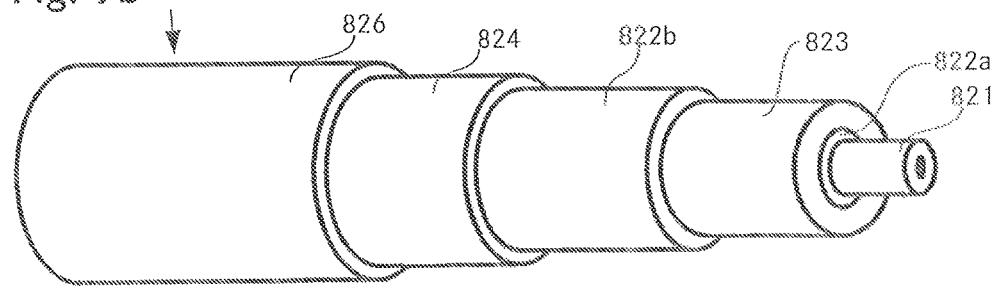

FIG. 9b shows a fluid-filled cable 82 prepared to be connected to a pipe-like unit 2 with a thread type connection system 61. The conductor 821 is bare on a length needed for the connection. This is about the length of the receiving part of the connection system, typically about half of the length of the connection piece 6. Typically this is also the length of the cap.

Following this part, there is a part where the insulating layer 823 is the outermost layer. This is the case on a length of the insulator tube 5. In this way, the fluid from the cable can fill the insulator tube 5 and can be regulated or measures by holes 42a, b in the middle region 42 of the fluid-filled cable connector 4.

Following this part the semi conductive layer 822b is the outmost layer. This is the case on a length of the inner 43 and middle 42 region of the fluid filled cable connector.

In a further part, the metallic layer 824 is the outermost layer. This part has a length of at least the length of the outer region 41 of the fluid-filled cable connector 4. This allows to solder the metallic layer 824 to the fluid-filled cable connector 4 whereby a fluid-tight, electrically conducting connection is formed.

FIG. 1 shows the connection of a solid-insulation cable to an oil-filled cable according to the invention. This is called a hybrid joint. There are only easy steps to do and only few parts needed to realize this hybrid joint. FIG. 1 shows the inner part of the hybrid joint. It comprises a pipe-like unit 2 and a body 3 with field shaping elements 7, namely two deflectors 7r, 7l and one electrode 7m.

The body 3 with the field shaping elements 7 is a pre-fabricated, single piece body as used for standard connections of two solid-insulation cables. The field shaping elements 7 are moulded into the body 3 during fabrication. The body is made out of an elastic material. The apertures of the body 3 are chosen to be slightly smaller than the largest cross section of one of the cables. The exact size of the apertures depends on the elasticity of the material: It has to be possible to place the cable inside the body 3, but once it is placed there should be a significant pressure on the cable sides resp. the pipe-like unit 2. The body 3 and the field shaping elements 7 surround the cables. The field shaping elements 7 are rotationally symmetric with the symmetry axis being the centre of the cable.

The pipe-like unit 2 comprises three parts: A fluid-filled cable connector 4, an insulator tube 5 and a connection piece 6.

The fluid-filled cable connector 4 and the connection piece 6 are made out of brass or an other conductive material like copper, aluminium, silver or an alloy containing at least one of these elements.

The contact between the connection piece and the insulation tube is established with an adhesive.

The fluid-filled cable connector 4 has different functions. On the one hand, it is connected to the fluid-tight metallic layer 824 of the fluid-filled cable 82 in a fluid-tight manner.

On the other hand, the deflector 7l is in electrical contact with the fluid-filled cable connector 4. This is needed to shape the electric field in the desired way.

The fluid-filled cable connector has three different regions 41, 42 and 43, of which two have different inner cross-sections: Region 41 is the outer region and its inner cross-section is slightly larger than the one of the middle region 42 and the inner region 43.

The fluid-filled cable to be connected is prepared in a way that the fluid-tight layer 804 is the outer layer in the region inside the outer region 41 and the outer semiconductor layer 802b is the outer layer in the region inside the middle region 42 and the inner region 43.

The fluid-tight layer 804 is connected by soldering in a fluid-tight way to the fluid-filled cable connector 4 once the cable is mounted in the joint 1a. If there is a larger gap between the fluid-tight layer 824 and the outer region of the fluid-filled cable connector 41, this gap can be filled with e.g. lead tape or another suitable material. This is shown in FIG. 6 which is later explained in more detail.

The electrical contact to the deflector 7*l* is simply established by the mechanical pressure of the body 3, which includes the field shaping elements 7, on the pipe-like unit 2. The cross section of the aperture and the size of the pipe-like unit 2 have to be chosen with respect to each other so that sufficient pressure is applied.

The connection between the fluid-filled cable connector 4 and the insulating tube 5 has to be fluid-tight. This fluid-tight connection is established with an adhesive According to a preferred embodiment, there are two holes 42*a*, 42*b* suitable to connect a pump in the middle region 42 of the fluid-filled cable connector 4. The holes 42*a* have protruding shafts 421. The hole 42*b* has no protruding shaft. A pump or a valve can be connected with this hole directly. The connections in both cases, with the holes 42 *a* or *b*, need to be fluid-tight.

The insulating tube 5 is of essentially cylindrical shape. It is made out of a fluid-tight insulator. If the joint is installed and working, fluid fills the gap between the cable and the inner side of the insulating tube 5. To prevent a spark-over at the outside of the insulating tube 5, its surface has to be as smooth as possible.

The connection piece 6 has two sides: A fluid-filled cable side 61 and a solid-insulation cable side 62. The fluid-filled cable side 61 forms a cavity 63. The connection piece 6 has essentially the shape of a cylinder with a separating wall 64 in the middle. The whole connection piece 6, both sides, the separating wall 64 and the fixing element used to connect the insulator tube 5, are preferentially made of a single piece of material.

The sides 61 and 62 of the connection piece 6 differ by the fact, that the cable connection systems are different and that only the fluid-filled cable side 61 is connected to an insulation tube 5.

The receiving part of the connection system 610 shown in FIG. 1 for the oil-filled cable 82 is provided with a thread to screw the pipe like unit 2 or the whole joint 1*a* on. A matching thread is mounted directly on the conductor 801 of the fluid-filled cable 81. There may be channels or similar holes in one or both threads in order to allow communication between the fluid from the central channel of the cable and the fluid in the insulation and inside the pipe-like unit. Both threads are made out of the material of the connection piece 6.

As the solid-insulation cable 81 does not need a fluid-tight connection, other connection systems are possible. One of them is shown in FIG. 1 and FIG. 8. There, the solid-insulation cable connection system 620 is the following: The conductor 811 of the solid-insulation cable 81 is entered in the solid-insulation cable side of the connection piece 62. The solid-insulation cable side of the connection piece 62 has holes 6201 with threads inside. Fixing elements 6201*a*, *b*, *c*—made out of a conducting material are screwed in these holes. The fixing elements 6201*a*, *b*, *c*—have a length so that they establish a tight contact with the conductor 811 of the solid-insulation cable 81 once they are in their final position. Preferentially they penetrate partially into the conductor 811. At the same time, the fixing elements 6201*a*, *b*, *c*—have a length that they do not protrude from the outside of the solid-insulation cable side of the connection piece 62 in direction of the body 3 once they are in their final position.

FIG. 7 shows a cut perpendicular to the cables central axis through a solid-insulation connection system 620 with a conductor 811 in its place. The conductor is fixed and electrically connected by the fixing elements 6201*a*, *b*, *c* which are screwed onto and partially into the conductor 811. The threads in the holes in the receiving part of the connection system 62 and on the fixing elements 6201*a*, *b*, *c* are present but not shown in this figure. Note, that the fixing elements 6201*a*, *b*, *c* do not protrude from the surface of the connection system 62 which is in this case also the outer surface of part of the connection piece 6.

FIG. 6 shows how lead tape 411 can be used to fill a radial gab between the metallic layer 824 of a fluid-filled cable 82 and the outer region 41 of the fluid-filled cable connector 4. In order to be able to show the lead tape, the fluid-filled cable connector 4 and the lead tape 411 are drawn as if they were transparent. The lead tape 411 is wrapped around the metallic layer 824 of the fluid-filled cable 82 until the radial gab is nearly closed. Then the pipe-like unit with the fluid-filled cable connector 4 is slipped over it. The fluid-tight connection is then realised by soldering.

FIG. 2 shows a second embodiment of the inner part of a high voltage cable joint 1*b*. In this case, two fluid-filled cables 82 are connected with a stop joint.

Compared with FIG. 1 and the pipe-like unit 2 used there, the only difference is, that the solid-insulation cable side of the connection piece 62 is replaced by a second fluid-filled cable side of the connection piece 61*r*. There is a second insulating tube 5*r* connected to this second side of the connection piece 61*r* and a second fluid-filled cable connector 4*r* connected to the second insulating tube 5*r*.

In order to have the same installation procedure of the body 3 as for the first embodiment, the holes 42*a*,*b*, in at least one of the fluid-filled cable connectors 4 have to be without protruding elements, i.e. of type 42*b*.

Because there is the need for fluid-tight connection systems 610, 610*r* for both cables, the solution with the two threads with different handedness inside the connection piece 6 is used.

In the case shown in FIG. 2, it is also possible to pre-fabricate the body 3 on the pipe-like unit 2. The cables are entered from two sides in the pipe-like unit 2. The inner diameter of the pipe-like unit should be chosen to be larger than the outer diameter of the outer semiconductor layer 822*b* of the cables 82. Therefore, the combination of the pipe-line unit 2 with the body 3 mounted on it can be turned to screw in the two cables without destroying the cables due to high torques.

If one does want to have a pressure regulation between the two cables, a connection joint can be used as shown in FIG. 3. For the use of that, both cables have to be filled with the same fluid, e.g. oil at the same pressure when in use. The joint and its installation possibilities are identical to the embodiment presented in FIG. 2. The difference is in the shape of the connecting piece 6*b*: There is no separating wall in this case. Therefore the two cavities 63 and 63*r* are connected.

In addition, FIG. 3 shows a fluid-filled cable connector 4*r* without holes in the side wall.

FIG. 4 shows the embodiment in which the pipe-like unit 2 is used for a termination lug 1*d* for oil- or fluid filled cables. The pipe-like unit 2 comprises a fluid-filled cable connector 4 which is similar to the one described above. It has the same structure with an outer, middle and inner region 41 to 43. There can be holes 42*a* in the fluid-filled cable connector 4. The fluid-filled cable connector 4 is connected in a fluid tight way to the insulating tube 5. The insulation tube 5 is again connected in a fluid tight way to the connection piece 6. The connection piece 6 comprises in this embodiment two sides: A fluid-filled cable side 61 and a termination lug side 10. The fluid-filled cable side has the same shape as in the embodiment shown in FIG. 3. The termination lug side 10 has the shape of a cylinder with a smaller diameter than the one of the fluid-filled cable side. In further embodiments, the termination lug side 10 can have different cross-sections: For example it can be circular, squared or hexagonal This cylinder is solid in a region pointing away from the cable connector and hollow on the other side. This inner diameter of this hollow region is however not bigger than the diameter of the cavity 63. The hollow region and the cavity 63 are connected.

The whole connection piece 6, both sides and the fixing element used to connect the insulator tube 5, are preferentially made of a single piece of material. Only the fluid-filled cable side 61 is connected to an insulation tube 5.

Any suitable receiving part of a connection system for oil-filled cables 82 can be used in this embodiment. This can be for example the thread based system shown in FIG. 1 but all alternatives described for the other embodiments are possible, too. The receiving part of the connection system is not explicitly shown in FIG. 4.

Figure 5B:
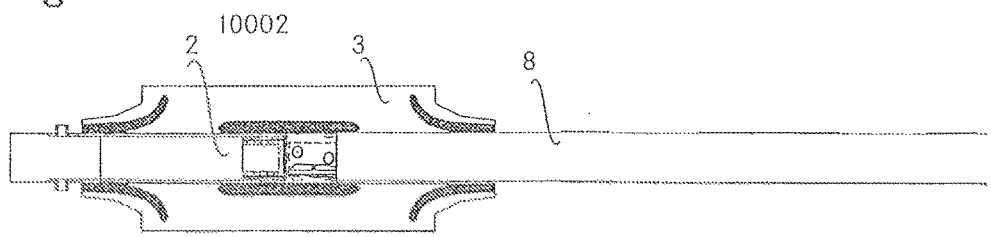

FIG. 5 shows the installation of the body 3 in the case that it is not pre-installed on the pipe-like unit 2. The body 3 is, prior to the installation of the pipe-like unit 2, placed on the cable to be connected on the side of the pipe-like unit without protruding elements 421. This is typically the solid-insulation cable 81 or a fluid-filled cable 82 with pressure regulation at another point. Then the installation of the pipe-like unit is done. First, the cables are prepared by e.g. freezing the fluid or stopping the fluid flow in another way in the case of a fluid-filled cable and removing the required length of the specific layers. Which cable is fixed first or if both are fixed together depends of the connection systems used and the method to handle the fluid during connection of the fluid-filled cable 81. Once the pipe-like unit 2 is installed, the region between the final position 10002 of the body 3 and the park position 10001 is cleaned and the body 3 is moved in the final position 10002.

For a complete joint, a screen and a protection layer are installed around the body 3 and connected with the screen and protection layers of the cables.

In addition to the already explained variations, it should be mentioned, that every fluid-filled cable connector 4, 4r shown in FIG. 1-4 can have every one of the three types of holes (42a, 42b, none) shown in FIG. 1-3.

The invention claimed is:

1. A device for connecting an end of a HV cable to an HV installation, comprising
   a) a pre-fabricated pipe-like unit, which comprises
   b) a connection piece made out of an electrically conducting material and
   c) an insulator tube which is connected to the connection piece in a fluid-tight way and
   d) a fluid-filled cable connector which is a part of the pre-fabricated pipe-like unit and which is connected to the connection piece in a fluid-tight way and which can provide a connection of a metallic layer of a fluid-filled cable to the pipe-like unit if the fluid-filled cable is connected to the pipe-like unit.

2. A device according to claim 1 wherein the connection piece comprises a receiving part of a connection system whereby the connection system establishes an electrical and mechanical connection between a conductor of the HV cable and the connection piece.

3. A device according to claim 1 whereby the connection piece has a non-deforming outer shape.

4. A device according to claim 2 wherein the connection piece forms a fluid-tight cavity and where a wall of the cavity forms the receiving part of the connection system.

5. A device according to claim 2, wherein the receiving part of the connection system has two openings, one being the opening to enter a counter part of the connection system and one connecting the receiving part of the connection system with a second receiving part of a second connection system.

6. A device according to claim 1 comprising a single-piece pre-moulded body with a continuous opening and including field shaping elements.

7. A device according to claim 1 wherein the fluid-filled cable connector is made out of a conducting material.

8. A device according to claim 6 wherein the fluid-filled cable connector comprises an inner region which is suitable to contact deflectors and a middle region which has a hole.

9. A device according to claim 1 wherein the pipe-like unit comprises only one connection piece, only one fluid-filled cable connector and only one insulation tube.

10. A device according to claim 1 wherein a termination lug is connected to the connection piece.

11. A device according to claim 1 wherein the pipe-like unit comprises two insulation tubes, two fluid-filled cable connectors and one connection piece.

12. A cable joint comprising a device according to claim 1 and at least one fluid-filled high voltage cable.

13. A termination comprising a fluid-filled high voltage cable and a device according to claim 10.

14. A method for installing the device of claim 1, comprising the following steps:
   a) Providing a bare end of a fluid-filled cable comprising a conductor, a semiconducting layer and metallic layer and a protection layer, by removing said layers from the conductor;
   b) Placing the pipe-like unit on the bare end of the fluid-filled cable and fixing the conductor to the connection piece.

15. A method according to claim 14 with the device of claims 6 and 9 and two HV cables from which at least one is a fluid-filled one, where the installation of the field shaping elements is done by
   a) Slipping the body in a park position on one of the cables prior to connecting them, and
   b) After connecting the cables, slipping the body on the pipe-like unit, so that all fluid-filled cable connectors contact a field deflector.

16. A method according to claim 14 with the device of claims 6 and 11 and two HV cables from which at least one is a fluid-filled one, where the installation of the field shaping elements is done by
   a) Slipping the body in a park position on one of the cables prior to connecting them, and
   b) After connecting the cables, slipping the body on the pipe-like unit, so that all fluid-filled cable connectors contact a field deflector.

17. A method according to claim 14 with the device of claim 8 comprising the steps
   a) Connecting a pump to the hole in the side of the fluid-filled cable connector
   b) Using a pump to remove any undesired fluids, e.g. air.

* * * * *